United States Patent

[11] 3,588,342

[72] Inventors Frans Brouwer
Glencoe;
Frank L. Sobchak, Chicago, Ill.
[21] Appl. No. 787,860
[22] Filed Dec. 30, 1968
[45] Patented June 28, 1971
[73] Assignee Stewart-Warner Corporation
Chicago, Ill.

[54] FACSIMILE COMMUTATOR SCANNING STRIP
6 Claims, 4 Drawing Figs.

[52] U.S. Cl. 178/7.6, 178/6
[51] Int. Cl. H04n 1/14
[50] Field of Search 178/6, 7.6; 346/139; 174/86, 117.11

[56] References Cited

UNITED STATES PATENTS

| | | | |
|---|---|---|---|
| 3,168,617 | 2/1965 | Richter | 174/117.11 |
| 3,380,070 | 4/1968 | Betts et al. | 346/139 |
| 2,792,448 | 5/1957 | Deuth et al. | 178/7.6 |

*Primary Examiner*—Robert L. Griffin
*Assistant Examiner*—Barry Leibowitz
*Attorneys*—Augustus G. Douvas, William J. Newman and Norton Lesser

ABSTRACT: A tape comprising strips of beryllium copper sandwiched between layers of mylar and connected in tandem to spaced scanning assemblies of a facsimile transceiver for movement past an object to be scanned. One end of the tape terminates at one of the scanning assemblies and the other end of the tape terminates at a rotor assembly about which the tape and scanning assemblies rotate in an eccentric path.

INVENTORS
Frans Brouwer
Frank L. Sobchak

By Morton Lesser
ATTORNEY

INVENTORS
Frans Brouwer
Frank L. Sobchak.

By Norton Lesser
ATTORNEY

FACSIMILE COMMUTATOR SCANNING STRIP

BACKGROUND OF THE INVENTION

1. Field of the Invention

The present invention pertains generally to facsimile scanning apparatus, and more particularly to a tape for providing electrical connections to facsimile scanning apparatus rotated in an eccentric path.

2. Description of the Prior Art

In a facsimile transceiver, such as disclosed and claimed in the copending applications of Frans Brouwer and Frank L. Sobchak Ser. Nos. 613,545, Filed Feb. 2, 1967 — 653,723, filed July 17, 1967—739,745, filed June 25, 1968 and 739,018, filed June 21, 1968, a document or other object is moved transversely to a plurality of scanning assemblies. The assemblies each include lamps and photocells for scanning a document to be reproduced at a remote location and a printer bar for reproducing a remotely located document. The assemblies are moved in sequence along a path extending parallel to a line on the document so that each assembly scans in sequence a successive portion of the document corresponding to the width of the document. The scanning assemblies are carried on a belt assembly which is controlled by pulley and roller assemblies located adjacent opposite ends of the document to return the scanning assemblies over a circuitous path to successively scan the document.

Due to the low photocell signal output, the use of a commutator for establishing a signal path therefrom is undesirable and instead a preamplifier which rotates in synchronism with the movement of the scanning assemblies is used and a fixed electrical connection is established between the photocells and preamplifier by means of a traveling tape incorporating electrical conductors. The tape is fastened at one end to a rotor assembly carrying the preamplifier and threaded in sequence through the scanning assemblies and the other end is fastened to the last assembly in the sequence.

Since the path of the scanning assemblies and tape is eccentric relative the rotor assembly, the distance between the first scanning assembly and the rotor assemblies varies to create an excess length of tape between the first scanning assembly and the rotor assembly where that scanning assembly is less than the maximum distance from the rotor assembly. The excess tape length forms a loop in the tape with relatively acute angles and it is cantilever supported so that oscillations and strain thereon are often excessive resulting in failure.

The problem is further complicated by the need to provide relatively large amounts of power to the lamps and printer bar and to provide electrically insulating material for the conductors. Heavy gauge conductors necessary to carry heavy power are, of course, easily subject to fracture under the described flexing conditions and complicate the problem of providing insulation, while high strength conductors of relatively small gauge provide insufficient conductivity, if used without a highly conductive plating for the photocell output.

SUMMARY OF THE INVENTION

The present invention solves the above mentioned problem by utilizing a tape comprising a sandwich of a plurality of beryllium copper conductors only 0.002 inch thick sandwiched between opposing 0.005 inch thick layers of a polyester sold by E. I. DuPont under the name mylar. This tape is capable of millions of flexures without fracture and because of the conductance and strength of the beryllium copper, the need for either plating the conductors with silver or the use of heavy gauge conductors is avoided, while the mylar. is capable of withstanding both the heavy currents in the beryllium conductors and maintaining the bond.

To further minimize the tape flexure the eccentricity in the path described by the tape is reduced significantly.

DESCRIPTION OF THE PREFERRED EMBODIMENT

Figure 1:
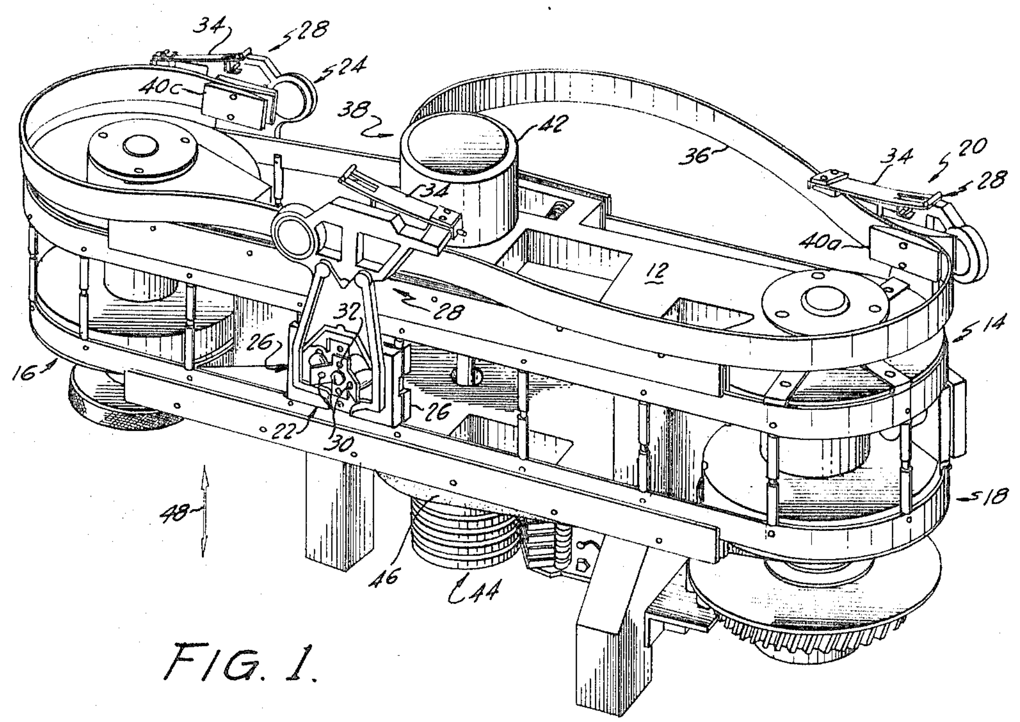
FIG. 1 is an isometric view of facsimile transceiver apparatus of the type described in the aforementioned applications utilizing a tape employing the principles of the present invention.
Figure 2:
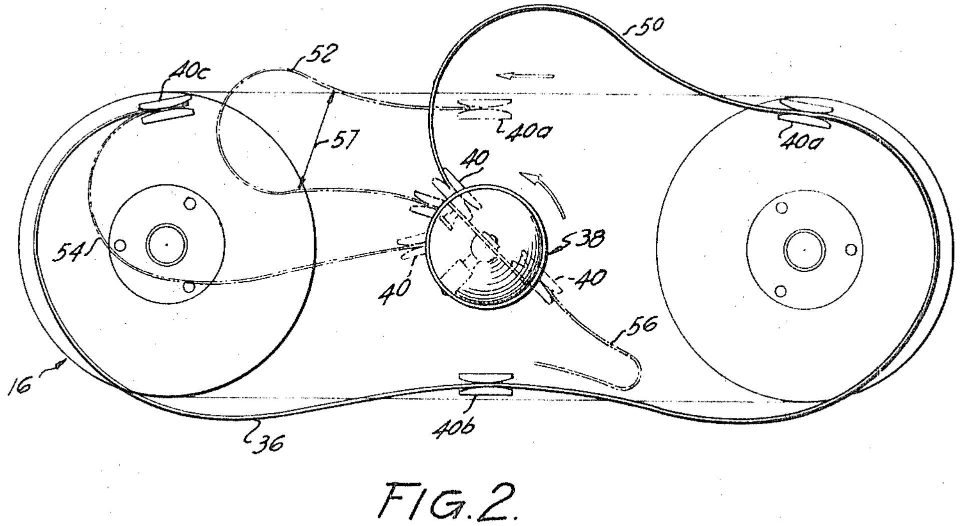
FIG. 2 is a top elevational largely schematic view illustrating the tape in various positions during its travel.
Figure 3:
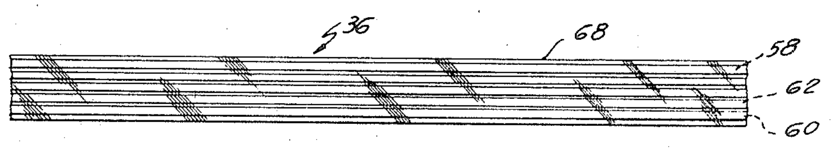
FIG. 3 is a plan view of a tape fragment.
Figure 4:
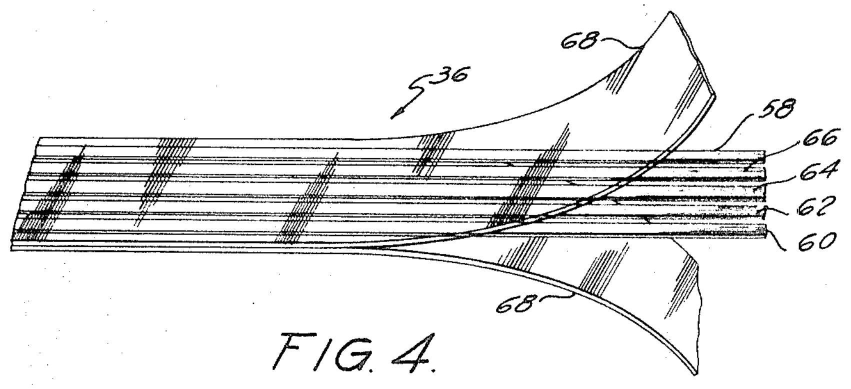
FIG. 4 is an enlarged fragmentary isometric view of the tape with the insulating layers partially stripped therefrom.

Referring now to FIG. 1, there is indicated generally by the reference character 10 a facsimile transceiver of the type described in the aforementioned applications. The transceiver apparatus 10 includes frame means 12, drive and idler pulley assemblies 14 and 16, respectively, a timing belt assembly 18 trained about the drive and idler pulley assemblies 14 and 16, scanning assemblies 20, 22 and 24 carried by the timing belt assembly 18 is spaced positions, and associated synchronizing and electrical transmission means. The axes of the drive and idler pulley assemblies are located 9 inches apart corresponding to the width of the widest document to be scanned.

Each scanning assembly 20, 22 and 24 includes a combined optical scanner carriage assembly 26, and a printer contact assembly 28. The combined optical and printer scanning assemblies 26 and 28 of each scanning assembly 20, 22 and 24 include a pair of lamps 30, a photocell 32 and a printer bar 34 connected to other electrical components of the transceiver apparatus 10 by means of a ribbon or tape 36 and a rotor assembly 38. Since each scanning assembly must begin its scan after the preceding assembly completes its scan over a width of 9 inches, the three scanning assemblies are each located 9 inches apart and the tape length totals 27 inches. Standards 40, *40a*, *40b* and *40c*, respectively, are provided on the rotor assembly 38 and assemblies 20, 22 and 24 for securing the tape and to facilitate electrical connections therefor.

The rotor assembly 38 is covered at the upper end by a can 42 and includes a commutator assembly 44 at the other or lower end for establishing electrical connections to a preamplifier, not shown, and rotated with the rotor assembly 38 for amplifying signals from the photocells 32 and to establish electrical connections to the lamps 30 and printer bars 34. The rotor assembly 38 is rotated about its own axis from the drive pulley assembly 14 by means of a belt 46. The pulley assembly 14 is driven by a motor (not shown).

When the drive pulley assembly 14 is rotated, the timing belt assembly 18 together with the scanning assemblies 20, 22 and 24 are moved at a typical speed of 2700 inches per minute and sometimes as high as 9000 inches per minute in a continuous closed path or loop extending in an arc of approximately 2.86 inches diameter around the pulley assemblies 14 and 16. This path is linear on opposite sides of a plane passing through the rotor and pulley assembly axes and spaced approximately 1¼ to 1½ inches from the axis of the rotor assembly. A document to be scanned for reproduction at a remote location moves generally in a plane indicated by arrowheads 48 and parallel to the described plane passing through the rotor and pulley assembly axes, while to permit reproduction from a remote location a treated paper is moved into association with the printer bars as described in the aforementioned applications. In any event the scanning assemblies 20, 22 and 24 and the tape 36 move in a circuitous path around the periphery of the drive and idler pulley assemblies with the path being eccentric relative to the axis of the rotor assembly 38.

In rotation along the described circuitous path, portions of the tape 36, especially between the first scanning assembly 20 and the rotor assembly standard 40, become longer than the shortest distance between the standard *40a* on scanning assembly 20 and the standard 40 on the rotor assembly. It is undesirable to tension the tape for avoiding tape slack, since tension introduces the possibility of vibrating, jittering or otherwise disturbing the photocell signal. The tape 36 therefore tends to form loops as indicated at 50, 52, 54 and 56 to accommodate the variable distance between standards 40 and 40*a* as the tape moves eccentrically relative the rotor axis. The loops 50, 52, 54 and 56 form rather sharp or acute angles especially at the juncture with the standards. For example, loop 52 may have a width of only 1½ inches indicated by the line 57 and it extends from standard 40 by as much as 3 inches. In addition, instead of being suspended directly between the standards 40 and **40*a*, the loops in tape 36** are cantilever extended therefrom so as to be excessively subject to oscillation and flexure at the described high speed.

The tape 36 as mentioned serves to provide electrical connections to the lamps 30. A conductor 58 for the lamp may carry as much as 1 amp while a conductor 60 for the printer bar contacts must supply approximately 0.3 amps. at up to 80 volts depending on the signal level. These conductors must be relatively heavy to carry the current load and yet thick conductors in this application will cause the material to flex past its elastic limit contributing to a fracture. Materials such as steel, which may have the necessary strength, require a precious metal plating to carry the output of the photocells without excessive signal attenuations, while materials such as phosphor bronze or copper do not have the necessary strength.

To solve these problems, the conductors 58 and 60 together with the three other conductors 62, 64 and 66 required by tape 36 are fabricated of beryllium copper type 190 XHMS sold by The Brush Beryllium Company, 17876 St. Clair Avenue, Cleveland, Ohio. The conductors 58, 60, 62, 64 and 66 each are chosen to be of approximately 0.002 inch thick with a width of approximately 0.06 inch to carry the required lamp and printer bar current. The conductivity of this material is sufficient to provide proper signal transmission. The spacing between conductors 58—66 is approximately 0.015 inch and they are sandwiched between bonded opposing layers 68 of electrically insulating polyester sold under the name mylar by E. I. DuPont Co. Each layer 68 is approximately 0.005 inch thick and 0.437 inch wide.

The described beryllium copper conductor material has a tensile strength in excess of 175,000 p.s.i. so as to insure sufficient strength in the described sectional thickness necessary to carry the heavy lamp and printer bar currents and at the same time has sufficient electrical conductivity. The use is similar to that of a flat spring. With the tape 36 constructed of the described materials, over 40,000,000 flexures have been achieved without fracture of the conductors or the mylar and without separation of the mylar layers 68 from the conductors.

The ability of the tape 36 to resist fracture is also enhanced by the relatively wide spacing of over 1 inch between the axis of the rotor assembly 38 and the closest adjacent position of standard **40*a*** with the relatively wide diameter 2.8 inches of the pulley contributing to minimizing the angle of tape flexure.

While there has been shown and described a preferred embodiment of the present invention, it will be understood by those skilled in the art that various rearrangements and modifications may be made therein without departing from the spirit and scope of the invention.

We claim:

1. A facsimile system and a tape for use therein comprising: a rotor assembly rotatable about a fixed axis and a scanning assembly moved in a circuitous path eccentric relative to the axis of said rotor assembly whereby the distance between said assemblies varies in accordance with the position of said a scanning assembly in said path, and a tape for extending fixed electrical connections between said rotor assembly and said scanning assembly said tape comprising a plurality of beryllium copper strips each having one end fastened to said rotor assembly for rotation therewith and suspended between said rotor assembly and said scanning assembly for extending respective electrical connections therebetween, and a layer of electrically insulating material bonded together on opposite sides of said strips for holding said strips in spaced relationship.

2. A facsimile system and a tape for use therein comprising: a rotor assembly rotatable about a fixed axis and a plurality of spaced facsimile scanning assemblies each having a lamp, photocell and printer bar assembly together with respective standards and adapted to be moved in a circuitous path eccentric to the axis of said rotor assembly for either scanning or reproducing a document, and a tape for extending fixed electrical connections between said rotor and said scanner assemblies said tape comprising a plurality of strips of beryllium copper in spaced parallel positions having one end supported on said rotor assembly and threaded through each of said scanning assemblies in sequence for extending electrical connections thereto, and a layer of mylar on opposite sides of each strip bonded together for electrically insulating and supporting said strips between said assemblies.

3. For use with a tape as claimed in claim 2, spaced drive and pulley assemblies located in positions spaced from the axis of said rotor assembly for moving said scanning assemblies in said circuitous path with said path following a portion of the periphery of said drive and pulley assemblies with the diameter of said drive and pulley assemblies being at least 2 inches.

4. A tape as claimed in claim 3 in which said rotor assembly rotates about one axis located a minimum of 1 inch from the portion of said path closest to said rotor assembly.

5. A tape as claimed in claim 2 in which said beryllium copper has a tensile strength of at least 150,000 pounds per square inch and each strip is substantially 0.002 inch thick.

6. A tape as claimed in claim 5 in which said mylar layers are substantially 0.005 inch thick.